US009326528B2

(12) United States Patent
Svozil et al.

(10) Patent No.: US 9,326,528 B2
(45) Date of Patent: May 3, 2016

(54) HEATER/MIXER FOR MANUFACTURING A FLAVORED PRODUCT

(71) Applicant: Garrett Popcorn Holding Company, LLC, Chicago, IL (US)

(72) Inventors: Brent P. Svozil, LaGrange Highlands, IL (US); Jessica R. Martin, Chicago, IL (US); Lance M. Chody, Lake Forest, IL (US)

(73) Assignee: Garrett Popcorn Holding Company, LLC, Chicago, IL (US)

( * ) Notice: Subject to any disclaimer, the term of this patent is extended or adjusted under 35 U.S.C. 154(b) by 131 days.

(21) Appl. No.: 14/075,638

(22) Filed: Nov. 8, 2013

(65) Prior Publication Data

US 2015/0128851 A1    May 14, 2015

(51) Int. Cl.
| | |
|---|---|
| A23G 3/02 | (2006.01) |
| B01F 15/06 | (2006.01) |
| A21C 1/14 | (2006.01) |
| B01F 15/00 | (2006.01) |
| A23G 3/20 | (2006.01) |
| H05B 1/02 | (2006.01) |
| B05C 3/00 | (2006.01) |
| F28D 21/00 | (2006.01) |

(52) U.S. Cl.
CPC ............ *A23G 3/0226* (2013.01); *A21C 1/1495* (2013.01); *A23G 3/20* (2013.01); *B01F 15/00772* (2013.01); *B01F 15/065* (2013.01); *H05B 1/0269* (2013.01); *B05C 3/005* (2013.01); *F28D 2021/0042* (2013.01); *F28D 2021/0052* (2013.01)

(58) Field of Classification Search
CPC ..... A23G 3/0226; A23G 3/20; A21C 1/1495; B01F 15/065; B01F 15/00772; F28D 2021/0042; F28D 2021/0052; H05B 1/0269; B05C 3/005

USPC ................... 366/197, 203, 144, 147; 99/348, 99/323.5–323.9; 165/109.1; 118/13, 26; 126/345, 343.5 R, 343.5 A
See application file for complete search history.

(56) References Cited

U.S. PATENT DOCUMENTS

| | | | | |
|---|---|---|---|---|
| RE23,709 | E * | 9/1953 | Page ........................... | 126/374.1 |
| 2,756,321 | A * | 7/1956 | Pappas .......................... | 219/438 |
| 6,073,542 | A | 6/2000 | Perez | |
| 6,082,248 | A * | 7/2000 | Turrel .......................... | 99/323.9 |
| 6,460,451 | B1 | 10/2002 | Helman | |
| 6,672,201 | B2 | 1/2004 | Evans, Sr. | |
| 7,530,302 | B2 | 5/2009 | Stephanou | |

FOREIGN PATENT DOCUMENTS

EP       2255676       12/2010

OTHER PUBLICATIONS

International Search Report and Written Opinion of corresponding PCT patent application, PCT/US2014/059233, mailed Mar. 5, 2015.

* cited by examiner

*Primary Examiner* — Laura Edwards
(74) *Attorney, Agent, or Firm* — Stine Law Ltd.

(57) ABSTRACT

An apparatus for heating a flavored coating and mixing the heated flavored coating with an edible substrate is disclosed. The apparatus comprises a frame adapted to support a kettle, the kettle for containing the flavored coating and the substrate to be mixed, a first heater box operative as a heat source, and a second heater box operative as a heat source. The first heater box is removably secured to the frame to permit removal of the first heater box and substitution therefore with the second heater box.

7 Claims, 4 Drawing Sheets

HEATER/MIXER FOR MANUFACTURING A FLAVORED PRODUCT

FIELD OF THE INVENTION

The present invention relates to a heater/mixer (hereinafter "mixer") for heating a flavored coating, such as caramel or a caramel mixture, and mixing the heated flavored coating with an edible substrate, such as popcorn, to coat the substrate with the heated coating, to manufacture a flavored product, such as caramel corn.

BACKGROUND

Heater/mixers for manufacturing flavored products are well known in the art. However such mixers typically have a heater box permanently attached to a frame. The heater box typically is either of a first type having a gas burner to produce a flame to produce the heat or of a second type having an electric heating element, such as infra-red, to produce the heat. This can lead to various problems, such as in the manufacture of the heater/mixer, or when one desires to substitute a gas burner heated heater box for an electrically heated heater box, or vice versa, on an existing heater mixer.

For example it is difficult if not impossible to convert an electrically heated mixer to a gas flame heated mixer, such as when the mixer is being moved to a site which has only gas, or vice versa. It also requires manufacturers of mixers to manufacture, and stock, both electrically heated and gas flame heated mixers.

SUMMARY

It is an object of the invention to provide a mixer with interchangeable electric and gas heating modules.

DESCRIPTION OF THE PREFERRED EMBODIMENT

It is to be understood that this disclosure is not intended to limit the invention to any particular form described, but to the contrary, the invention is intended to include all modifications, alternatives and equivalents falling within the spirit and scope of the invention as defined by the appended claims.

Figure 1:
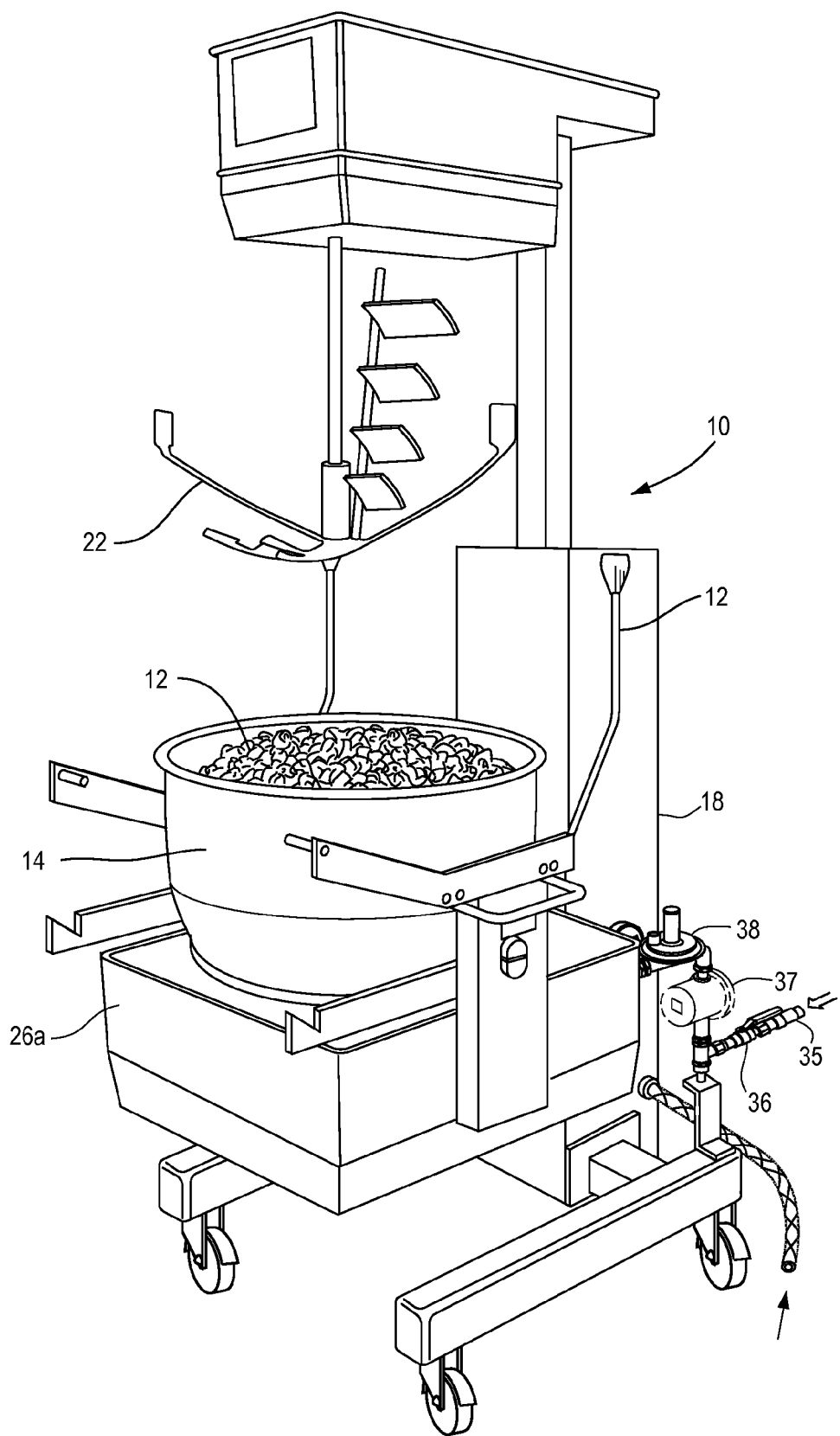
FIG. 1 is a perspective view of a heater/mixer in accordance with the present invention.

An apparatus, generally designated 10 and also referred to as a heater/mixer, is illustrated in FIG. 1. The heater/mixer 10 heats a flavored coating, such as caramel, and mixes the heated caramel with an edible substrate 12, such as popcorn. For purposes of this description, caramel as a flavored coating will be described, but other coatings, well known in the art, may be used.

Heater/mixers are generally well known in the art.

The heater/mixer 10 includes such conventional items as a kettle 14 for containing the caramel and the popcorn 12 to be mixed.

The heater mixer 10 further includes a frame 18, a lever mechanism 20 for tipping the kettle 14, such as to empty the kettle 14 when the heating and mixing is complete. The heater mixer 10 further includes a conventional motor (not shown) actuated beater 22.

Conventional heater/mixers include heater boxes, generally permanently secured to the frame, which may be either heated by a gas burner 24 (FIG. 2) or an electric heating element 25 (FIG. 4), such as an infrared heating element.

Figure 4:
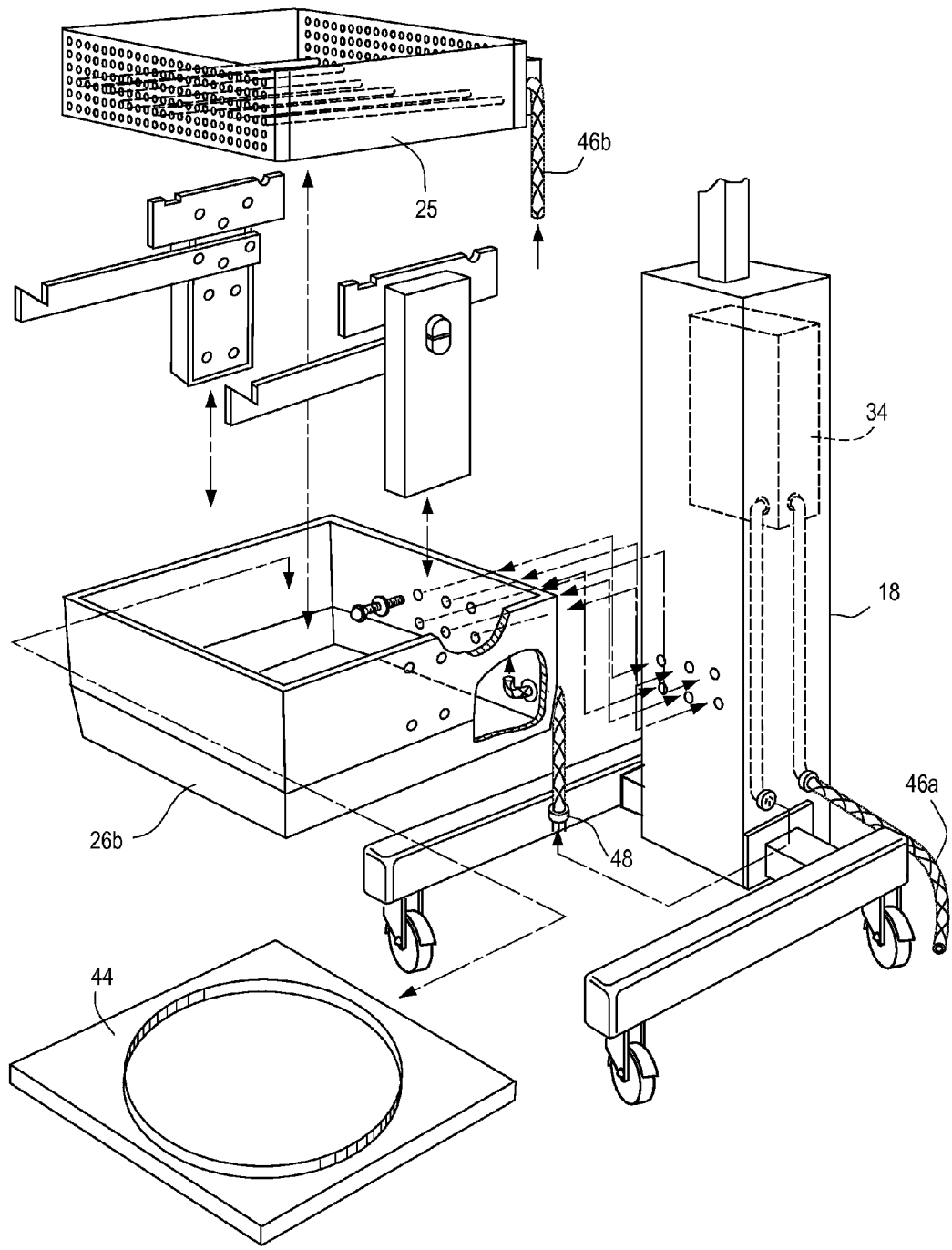
FIG. 4 is an exploded view of the heater/mixer of FIG. 1, incorporating an electric heating element.

In accordance with the present invention, the heater/mixer 10 may include either a removable heater box, which may be a removable gas-fired heater box 26a (see FIGS. 1-2) or a removable, electrically heated heater box 26b (FIG. 4).

The removable heater box permits interchangability between the types of heater boxes 26a, 26b. The removable heater box also permits simplified replacement of one type of heater box (26a or 26b) with a heater box (26a or 26b) of the same type.

Either type of the heater boxes 26a, 26b, is removably attached to the frame 18 by a releasable securing device 28, such as one or more bolts 30.

Each of the types of heater boxes 26a, 26b, is generally conventional, but for their removable attachment to the frame 18.

Figure 2:
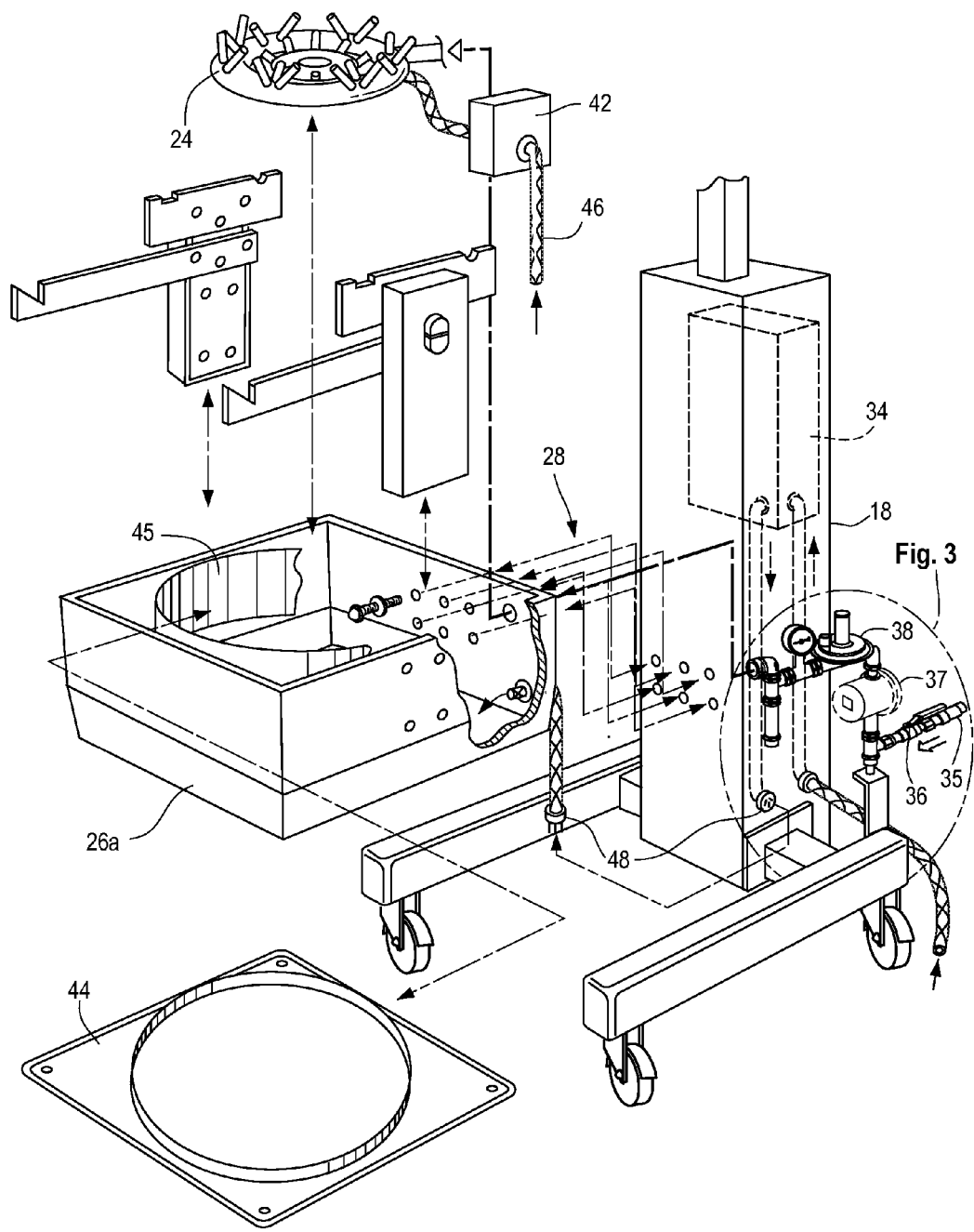
FIG. 2 is an exploded view of the heater/mixer of FIG. 1, incorporating a gas burner.
Figure 3:
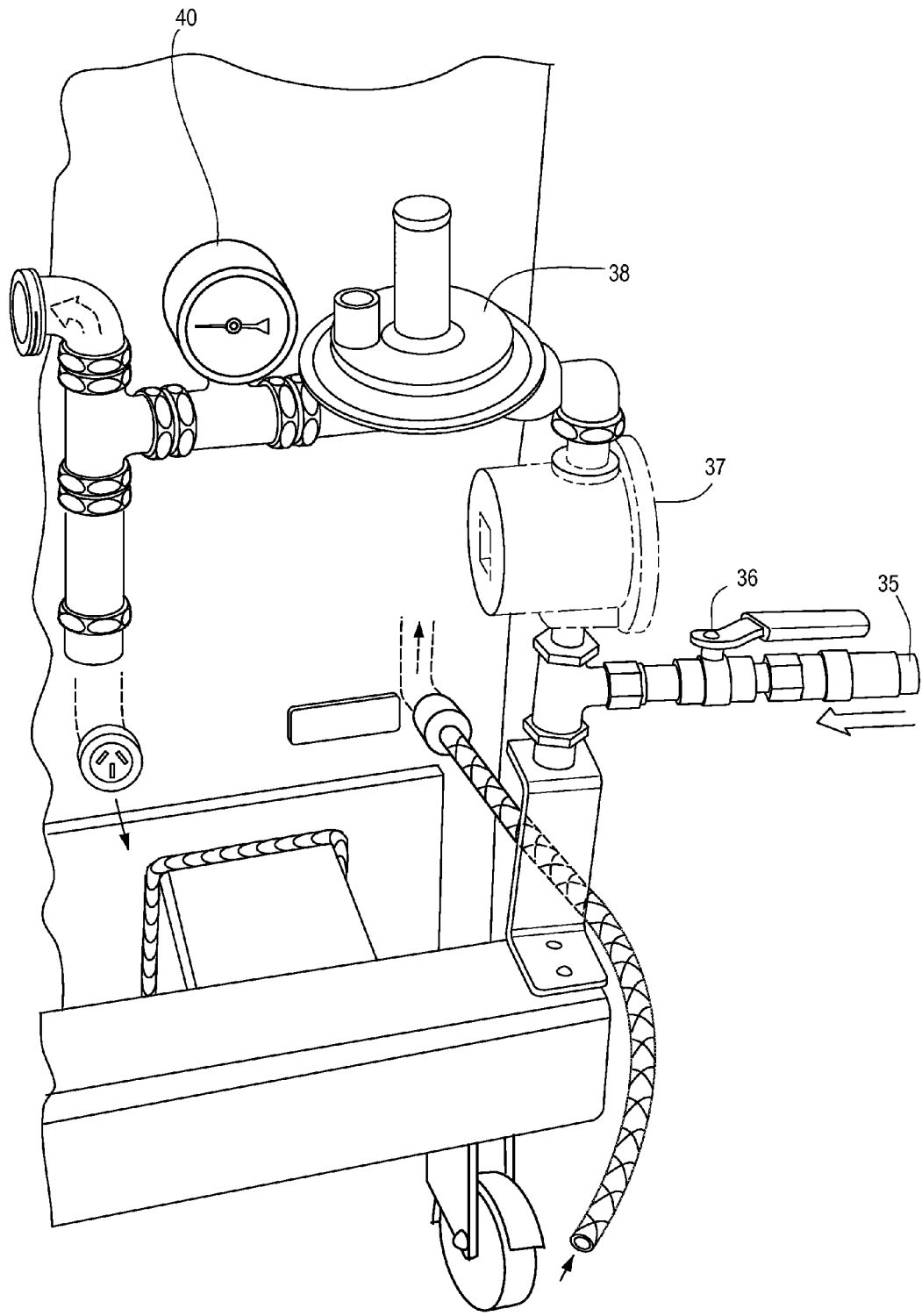
FIG. 3 is a detailed view of the portion "FIG. 3" of the heater/mixer of FIG. 1.

Referring in particular to FIGS. 1-2, gas is provided to the gas fired burner 24 via a gas supply 35, which may be removably connected to a source of as (not shown). The gas supply 35 may include a shut-off valve 36, a gas filter 37 (for European CE compliance), a conventional pressure regulator 38 and a pressure gauge 40.

As illustrated in FIG. 2, the gas supply continues into the gas heater box 26a, through a conventional gas control module 42, to the gas burner 24. The gas control module 42 performs such conventional functions as igniting pilot burners, confirming the pilot burners have been ignited and subsequently turning on the gas to the main, burners of the gas burner 24. The control module 42 may also regulate the gas burner 24 to regulate the temperature of the gas heater box 26a.

Removal of the gas heater box 26a may include removal of the gas supply 35.

The gas heater box 26a may also include a wiring harness 46 extending from the control module 42 to a control panel 34, which may be located inside of the frame 18. The wiring harness may include a an electrical disconnect 48 to permit disconnection of the gas heater box 26a from the frame 18.

The gas heater box 26a may include a cover 44 and an annular ring 45. The gas burner 24 fits into the ring 45, and the ring 45 concentrates the heat from the gas burner 24 towards the kettle 14.

The heater/mixer 10 having the electric heater box 26b with the electric heating element 26b is illustrated in FIG. 4. Elements of the heater/mixer 10 having the electric heater box 26h common to those of the heater/mixer 10 having the gas heater box 26a have retained the same reference numbers.

The heater/mixer 10 having the electric heater box 26b includes an electrical wiring harness 46 which has a first end end 46a adapted to be connected to an electrical power supply (not shown) and a second end 46b which connects to the electric heating element 26b. Between the first end 46a and the second end 46h, travels to the control panel 34, and into the electric heater box 26b, where it attaches to the electric heating element 25. The wiring harness 46 includes an electrical disconnect 48, to permit removal of the electric heater box 26 from the frame 18. The wiring harness 46 provides both control and power to the electrical heater box.

The electric heater box may include a conventional temperature sensor not shown) to permit regulation of the temperature of the electric heater box 26b by the control panel 34.

As discussed above, the electric heater box 26b is removably attached to the frame 18 by a releasable securing device 28, such as one or more of the bolts 30a.

Preferred embodiments of this invention have been described herein. It should be understood that the illustrated embodiments are exemplary only and should not be taken as limiting the scope of the invention.

What is claimed is:

1. An apparatus for heating a flavored coating and mixing the heated flavored coating with an edible substrate comprising:
    a frame adapted to support a kettle, the kettle for containing the flavored coating and the substrate to be mixed;
    a beater for mixing the flavored coating and the substrate;
    a heater box secured to the frame, wherein the heater box provides heat to heat the flavored coating, wherein the heater box may be either a first type in the form of a gas burner heater box or a second type in the form of an electrically heated heater box, and the heater box is removably secured to the frame to permit interchangability between the types of heater boxes and;
    a control panel for selectively operating the secured one of the gas burner heater box and the electrically heated heater box.

2. The apparatus of claim 1 wherein the heater box is removably attached to the frame by a releasable securing device.

3. The apparatus of claim 2 wherein the securing device comprises a bolt.

4. The apparatus of claim 3 wherein the securing device comprises a plurality of bolts.

5. The apparatus of claim 1 wherein:
    the control panel is removably connectable to both of the types of control modules.

6. The apparatus of claim 5 wherein the control panel is removably connectable to each of the types of heater boxes by a wiring harness.

7. The apparatus of claim 6 wherein the wiring harness provides both control and power to the electrical heater box.

\* \* \* \* \*